Patented Mar. 7, 1933

1,900,883

UNITED STATES PATENT OFFICE

OSCAR W. LUSBY, OF BALTIMORE, MARYLAND, ASSIGNOR TO WILBERT J. HUFF, OF BALTIMORE, MARYLAND

PROCESS FOR PURIFYING GAS

No Drawing. Original application filed January 28, 1928, Serial No. 250,338. Divided and this application filed April 9, 1929, Serial No. 353,895, and in France January 22, 1929.

The present invention relates to the removal of organic sulfur compounds from gases and has particular reference to a catalytic process for the conversion of organic sulfur compounds to hydrogen sulfide, which is easily removable from the gas by known methods.

This application is a division of my co-pending application Serial No. 250,338, filed Jan. 28, 1928.

The removal of organic sulfur from gases has heretofore been attempted through the use of solutions or solid absorbents, or by the use of such catalysts as nickel at elevated temperatures. The removal of organic sulfur is important in connection with the purification of gas for domestic use and especially in connection with the purification of gas to be used in the synthesis of organic compounds by catalytic methods.

I have discovered that catalysts comprising certain combinations consisting originally of metals, or their oxides or hydroxides, of the sixth and seventh groups of the periodic system of elements according to Mendeleef as shown in the table on pages 474 and 475 of the Chemical Rubber Handbook of Chemistry and Physics by Hodgman and Lange, 13th edition, 1928, are extremely active and permanent. These catalysts are preferably operated above 200° C., no upper limit being specified when the organic sulfur is not accompanied by hydrogen sulfide. It has been found, however, that there is a tendency at high temperatures to synthesize organic sulfur when hydrogen sulfide is present in the gas and that, at suitable space velocities, the substantially complete conversion of the organic sulfur to hydrogen sulfide, even in the presence of additional amounts of hydrogen sulfide, can be effected at lower temperatures.

I have further found that oxides of elements of the sixth group of the periodic system, when combined with oxides of elements of other groups, especially of the first to fifth, inclusive, and of the eighth, groups are especially effective in the conversion of organic sulfur into hydrogen sulfide. For instance, experiments have indicated to be effective combinations consisting originally of mixtures of the oxides or hydroxides of the metals, as follows:—those of uranium, with those of cerium, copper, antimony, and other metals; those of chromium with those of copper, cerium, thorium, and other metals; and those of tungsten and molybdenum with those of metals of other groups of the periodic system. The composition, based on the content of the metals, of the combinations which have been especially satisfactory are:

50% uranium and 50% copper
80% uranium and 20% cerium.

The catalysts may be coated on a carrier, such as pumice or broken firebrick, or used without a carrier. When a carrier is employed, the catalysts may be prepared by the addition of solutions of the nitrates or other compounds of the components of the catalysts to a carrier and heating the mixture to decompose the compounds, leaving an intimate mixture of the oxides of the metals on the carrier, or they may be precipitated on the carrier from solutions of their salts, such as their nitrates. When no carrier is used, the catalysts may be prepared in a form resistant to crumbling, either by precipitation from a mixture of solution of salts of their components, and subsequently washing and compressing the precipitate, or in certain of the combinations above mentioned, the fusion of the intimately mixed oxides of the metals, or the metals themselves.

In the course of researches leading to this invention I have found that certain organic compounds, such as thiophene, which are but little, if any, affected by the action of nickel or other known catalysts, may be converted into hydrogen sulfide, although at a somewhat lower rate than when the organic sulfur consists exclusively of carbon disulfide.

Wherever in the claims the term metal is used, or a particular metal is specified, I intend to cover thereby not only the metal but also its equivalents as set forth in the specification, viz. its oxides and its hydroxides.

Now having fully described my invention, what I claim as new and desire to secure by Letters Patent of the United States is:

1. The process of converting organic sulfur compounds to hydrogen sulfide in a gas containing elementary hydrogen and which may be free from oxygen and water vapor which comprises reacting a portion of said hydrogen with organic sulfur by subjecting said gas at a temperature above 200° C. to the action of a solid catalyst containing at least one metal included in the sixth and seventh groups of the periodic system of the elements in combination with at least one of the following named elements: copper, cerium, thorium, and antimony.

2. The process of converting organic sulfur compounds to hydrogen sulfide in a gas containing elementary hydrogen and which may be free from oxygen and water vapor which consists in reacting at least a portion of said hydrogen with organic sulfur by subjecting said gas at a temperature above 200° C. to the action of a solid catalyst containing a combination of at least one metal included in the sixth and seventh groups of the periodic system with copper.

3. The process of converting organic sulfur compounds to hydrogen sulfide in a gas containing elementary hydrogen and which may be free from oxygen and water vapor which comprises reacting a portion of said hydrogen with organic sulfur by subjecting said gas at a temperature above 200° C. to the action of a solid catalyst consisting of a combination of at least one metal included in the sixth and seventh groups of the periodic system with cerium.

4. The process of treating gas containing elementary hydrogen, hydrogen sulfide and organic sulfur compounds which comprises eliminating the greater part of the hydrogen sulfide and causing at least a portion of the said hydrogen to react with organic sulfur by then subjecting the gas to the action of a solid catalyst containing at least one metal included in the sixth and seventh groups of the periodic system of elements in combination with at least one of the following named elements: copper, cerium, thorium, and antimony.

5. The process of converting organic sulfur compounds to hydrogen sulfide in a gas containing elementary hydrogen and which may be free from oxygen and water vapor, which consists in reacting at least a portion of said hydrogen with organic sulfur by subjecting said gas at a temperature above 200° C. to the action of a solid catalyst containing a combination of at least one metal included in the sixth group of the periodic system with copper.

6. The process of converting organic sulfur compounds to hydrogen sulfide in a gas containing elementary hydrogen, and which may be free from oxygen and water vapor, which consists in reacting at least a portion of said hydrogen with organic sulfur by subjecting said gas at a temperature above 200° C. to the action of a solid catalyst containing a combination of at least one metal included in the sixth group of the periodic system with cerium.

7. The process of converting organic sulfur compounds to hydrogen sulfide in a gas containing elementary hydrogen and considerable quantities of other organic compounds and which may be free from oxygen and water vapor which comprises reacting a portion of said hydrogen with organic sulfur by subjecting said gas at a temperature above 200° C. to the action of a solid catalyst containing at least one metal included in the sixth and seventh groups of the periodic system of the elements in combination with at least one of the following named elements: copper, cerium, thorium, and antimony.

8. The process of converting organic sulfur compounds to hydrogen sulfide in a gas containing elementary hydrogen and considerable amounts of other organic compounds and which may be free from oxygen and water vapor which consists in reacting at least a portion of said hydrogen with organic sulfur by subjecting said gas at a temperature above 200° C. to the action of a solid catalyst containing a combination of at least one metal included in the sixth and seventh groups of the periodic system with copper.

9. The process of converting organic sulfur compounds to hydrogen sulfide in a gas containing elementary hydrogen and considerable quantities of other organic compounds and which may be free from oxygen and water vapor which comprises reacting a portion of said hydrogen with organic sulfur by subjecting said gas at a temperature above 200° C. to the action of a solid catalyst consisting of a combination of at least one metal included in the sixth and seventh groups of the periodic system with cerium.

10. The process of treating gas containing elementary hydrogen, hydrogen sulfide and organic sulfur compounds and considerable quantities of other organic compounds which comprises eliminating the greater part of the hydrogen sulfide and causing at least a portion of the said hydrogen to react with organic sulfur by then subjecting the gas to the action of a solid catalyst containing at least one metal included in the sixth and seventh groups of the periodic system of elements in combination with at least one of the following named elements: copper, cerium, thorium, and antimony.

11. The process of converting organic sulfur compounds to hydrogen sulfide in a gas containing elementary hydrogen and considerable amounts of other organic sulfur compounds, and which may be free from oxygen and water vapor, which consists in reacting at least a portion of said hydrogen with organic sulfur by subjecting said gas at a temperature above 200° C. to the action of a solid catalyst containing a combination of at least one metal included in the sixth group of the periodic system with copper.

12. The process of converting organic sulfur compounds to hydrogen sulfide in a gas containing elementary hydrogen and considerable amounts of other organic cmpounds, and which may be free from oxygen and water vapor, which consists in reacting at least a portion of said hydrogen with organic sulfur by subjecting said gas at a temperature above 200° C. to the action of a solid catalyst containing a combination of at least one metal included in the sixth group of the periodic system with cerium.

13. The process of converting organic sulfur compounds to hydrogen sulfide in a gas containing elementary hydrogen and considerable amounts of other organic compounds, and which may be free from oxygen and water vapor, which consists in reacting at least a portion of said hydrogen with organic sulfur by subjecting said gas at a temperature above 200° C. to the action of a solid catalyst containing a combination of at least one metal included in the sixth group of the periodic system with thorium.

14. The process of converting organic sulfur to hydrogen sulfide in gas containing hydrogen which consists in subjecting said gas to the action of a catalyst consisting of a mixture of at least one of the metals of the sixth group of the periodic system with copper at a temperature above 200° C.

15. The method of converting organic sulfur to hydrogen sulfide in gas containing hydrogen which consists in subjecting said gas to the action of a catalyst consisting initially of a mixture of cerium with at least one of the metals of the sixth group of the periodic system.

16. The method of converting organic sulfur to hydrogen sulfide in gas containing hydrogen, which consists in subjecting said gas to the action of a catalyst consisting of an intimate mixture of uranium and cerium at a temperature above 200° C.

17. The method of converting organic sulfur to hydrogen sulfide in gas containing hydrogen, which consists in subjecting said gas to the action of a catalyst consisting of an intimate mixture of uranium and copper at a temperafure above 200° C.

In testimony whereof I hereunto affix my signature.

OSCAR W. LUSBY.